United States Patent

MacNamee et al.

Patent Number: 5,212,684
Date of Patent: May 18, 1993

[54] PROTOCOL AND TRANSCEIVER FOR CORDLESS/CELLULAR TELEPHONE SERVICE

[75] Inventors: Robert J. G. MacNamee, Cambridge; Sunil K. Vadgama, Thornton Heath, both of Great Britain

[73] Assignee: U.S. Philips Corporation, New York, N.Y.

[21] Appl. No.: 575,116

[22] Filed: Aug. 30, 1990

[30] Foreign Application Priority Data

Sep. 1, 1989 [GB] United Kingdom ............... 8919824

[51] Int. Cl.⁵ .................... H04B 7/26; H04L 5/14; H04Q 7/02; H04Q 7/04
[52] U.S. Cl. .................................. 370/24; 370/79; 379/61; 455/33.1; 455/54.1
[58] Field of Search .............. 370/24, 29, 32, 79; 379/59, 60, 61; 455/33.1, 54.1, 53.1, 54.2, 56.1, 33.2

[56] References Cited

U.S. PATENT DOCUMENTS 4,989,230  1/1991  Gillig et al. ................... 379/61
5,117,449  5/1992  Metroka et al. ............... 379/61

Primary Examiner—Wellington Chin
Attorney, Agent, or Firm—David R. Treacy

[57] ABSTRACT

A communications system suitable for use with hand portable radio telephones operating in a cellular mode, the typical cell size being between 500 m and 3 km radius. Each cell comprising at least one primary or base station (10) connected to the PSTN and one or more secondary portable stations (14) which are capable of roaming within the cell. Radio communication between the stations can be initiated by either station. Each primary and secondary station having radio transceiving means for time division duplex communication between the stations, a codec operating at 32 kbits/second or 11.4 kbits/second and means for transmitting digitised speech in accordance with a framed structure comprising 3 full rate or 6 half rate channels per carriers, the carrier being modulated at a carrier bit rate of substantially 270.8333 kbits/second. Provision is made for internal and external handover, if required. Also, if required, the secondary station can be constructed to operate in the DECT system as well as in the above described system.

24 Claims, 4 Drawing Sheets

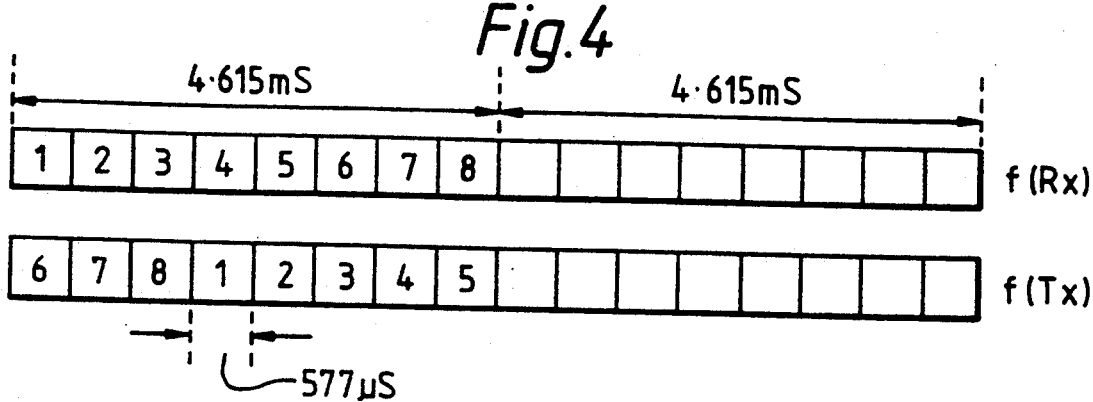
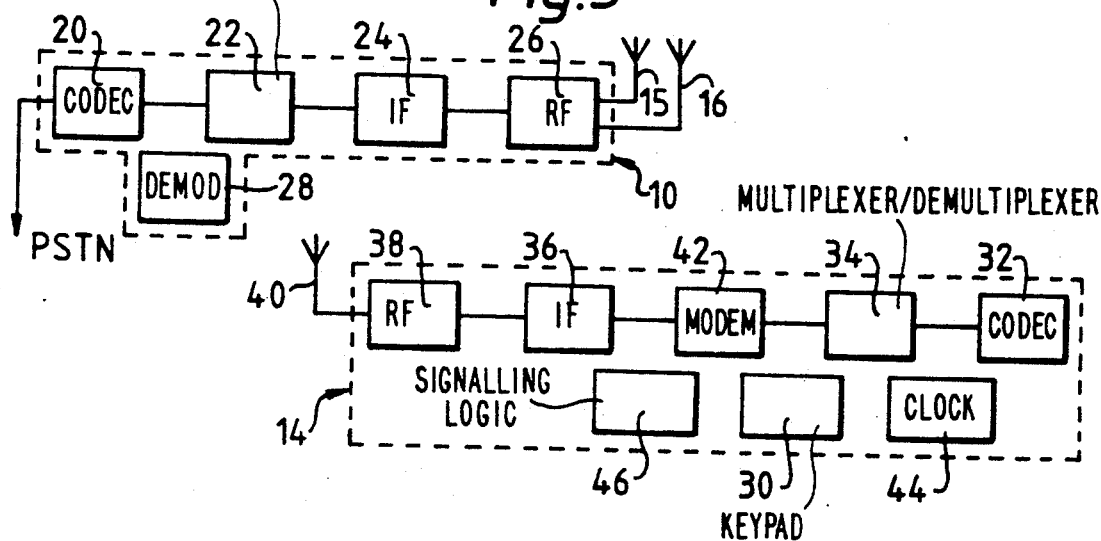
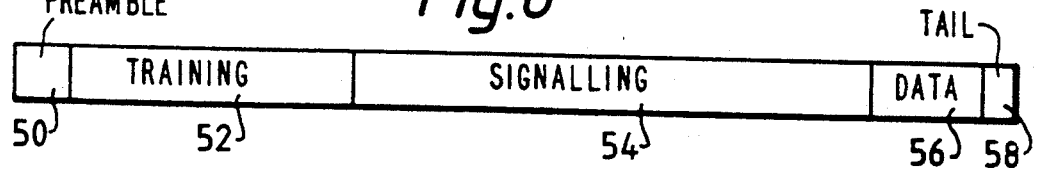
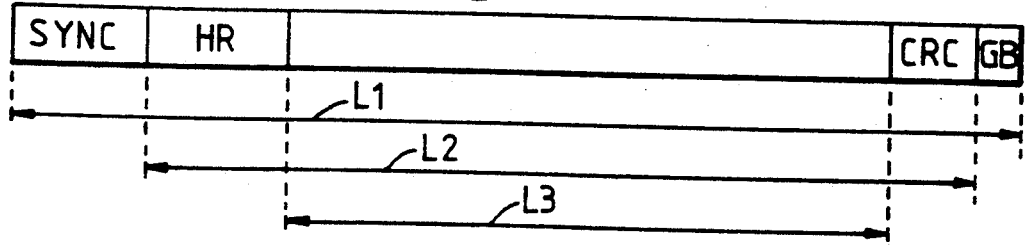

Fig.14

| E-PAGE | 1 | 5 OCTETS TMSI | CRC |

Fig.15

| E-PAGE | 0 | 3 OCTETS TMSI | FC | CC | CRC |

Fig.16

| LAI | LAI | CRC |

Fig.17

| MEAS-RPT | | MR1 | MR2 | CRC |

Fig.18

| H/O-Sgst | CELL ID | CHANNEL DESCRIPTION | CRC |

Fig.19

| IDLE | NULL | CELL ID | SYSTEM INFORMATION | CRC |

Fig.20

| BCCH | BCCH CODE | CELL ID | SYSTEM INFORMATION | CRC |

PROTOCOL AND TRANSCEIVER FOR CORDLESS/CELLULAR TELEPHONE SERVICE

BACKGROUND OF THE INVENTION

The present invention relates to a communications system having particular, but not exclusive, application to a short range (for example 0.5 to 3 km radius) hand portable mobile communications system in which a portable transceiver unit is capable of being called via a radio link from a base station connected to the public switched telephone network (PSTN) or is capable of making outgoing calls by way of a radio link to the base station.

Two known communications systems involving speech in which the first or final link in communications chain is by way of a duplex radio link are GSM (Groupe Special Mobile) digital cellular system and the DECT (Digital European Cordless Telecommunications) system. In the former case, that is GSM, a secondary or mobile station can make and receive telephone calls while roaming throughout the service area, if necessary at relatively high speeds of say 250 km/hr, through successive cells each having primary or base stations capable of call handover to the base station of the adjacent cell. The GSM system provides 8 duplex GSM channels per GSM carrier pair. Although GSM is a fully defined and functional digital cellular system it does have some disadvantages in that it is complex and the handset will be expensive. Additionally it is incapable of being used as a simple cordless telephone which would be cheaper to use.

The DECT system is a cordless telecommunications system in which the radio range is of the order of 100 m. DECT makes provision for contiguous radio coverage over local areas but not over larger metropolitan areas or nationwide. A portable unit therefore has to remain in range of the base station or a group of base stations through which a call is being made. Furthermore the portable unit is incapable of receiving incoming calls while outside the coverage region of the base station, although a portable unit can be alerted by a paging signal assuming that the portable unit incorporates a pager or the user is carrying a pager. As the peak effective radiated power of DECT portables is low, their range is limited and in consequence they cannot be extended to medium or large cells without extreme difficulty. The DECT system is a time division duplex (TDD) system having 12 duplex DECT channels per DECT carrier.

SUMMARY OF THE INVENTION

An object of the present invention is to provide a metropolitan cellular and cordless telecommunications system using hand portable transceivers.

According to one aspect of the present invention there is provided a communications system in which data or digitised speech is transmitted between a primary and a secondary station and vice versa in accordance with a frame structure comprising 3 full rate duplex channels per carrier in which each full rate channel either comprises data or digitised speech at substantially 32 kbits per second or, optionally, comprises up to 2 half rate duplex channels comprising data or digitised speech at substantially 11.4 kbits per second, the carrier being modulated at a carrier bit rate of substantially 270.8333 kbits per second.

More particularly the system in accordance with the present invention comprises a primary station, a secondary station, the primary and secondary stations each having radio transceiving means for duplex radio communication between the stations, encoding means for digitising speech and decoding means for recovering speech from received digitised speech, and means for transmitting the digitised speech in accordance with a frame structure comprising 3 full rate channels per carrier in which each full rate channel either comprises data or digitised speech at substantially 32 kbits per second or, optionally, comprises up to 2 half rate duplex channels comprising data or digitised speech at substantially 11.4 kbits per second, the carrier being modulated at a carrier bit rate of substantially 270.8333 kbits per second.

In an embodiment of the present invention the frame length is substantially 10 mS.

Communication between the primary and secondary stations may be by single frequency time division duplex. Single frequency operation is preferred to say the two frequency operation of GSM because the means for ensuring a reliable channel, that is one having an improved error performance, can be relatively simple. Although the DECT system is a single frequency time division duplex system, it has 12 duplex channels in a 10 ms frame period and the modulation rate is 1.152 Mbits per second, such a system is unsuited for use over ranges of greater than say 200 meters unless high peak effective radiated powers are used and complex channel equalisers are employed to overcome intersymbol interference due to multiple path effects.

A modulation parameter (bandwidth × time) BT of 0.3 may be used. A modulation scheme having such a modulation parameter is more channel efficient than the BT of 0.5 used in DECT. By having a modulation parameter of 0.3 and a modulation rate of 270.8333 kbits per second it is possible to have a carrier separation of 200 kHz. This is the same as is used in GSM. However compared to DECT, if its modulation rate was reduced to one quarter of that specified, that is to 288 kbits per second, it would be necessary to have a carrier spacing of 432 kHz for a BT of 0.5.

Although the communications system in accordance with the present invention is different from GSM and DECT it nevertheless has features which will enable it to be implemented by using components developed for, or based on those developed for, GSM and DECT equipments and in consequence the system can be established fairly rapidly.

Furthermore the equipments can be adapted fairly easily to be compatible with DECT and GSM services and thereby enabling a user to have a choice of which service to use in a particular situation. For example by a secondary station also having means for altering the modulation rate to 1.152 Mbits/second, for altering the multiplexing rate to 12 duplex channels in a 10 millisecond frame and for selecting the appropriate protocol, it can additionally be used in the DECT system. Alternatively by a secondary station permitting two frequency duplex operation and having means to alter the framing rate to 8 duplex channels and to perform channel interleaving, then the adapted equipment is capable of full GSM operation. In its non-adapted form the secondary station is capable of operating in a cellular arrangement in which in a metropolitan environment the cell size is typically between 500 meters and 3 km radius. The secondary stations are intended to be relatively slow moving, hand portables so that in the majority of cases the user remains in communication with one and the same primary station and insodoing there is no requirement for call handover which simplifies the primary stations and reduces the amount of signalling between primary stations. For each secondary station, the probability for handover will be small which reduces the overall amount of signalling between the primary stations and their associated controller. However there will be occasions where handover is necessary to maintain an acceptable level of service. As far as network signalling is concerned two different types of handover can be distinguished, these are internal and external. In the case of internal handover, the operation is handled autonomously by a primary station controller (BSC) without reference to a mobile switching centre (MSC). However the MSC may be informed when the handover operation has been completed. In the case of external handover, the MSC is informed by a secondary station that an external handover may be needed. The MSC then decides if and when the operation should be performed and which channel to use. An external handover will also involve two BSCs and in some cases two MSCs will be involved.

Protocols for use in the system may comprise substantially GSM network layer protocols and protocols derived from DECT link and physical layer protocols. GSM network layer protocols enable the full functionality of a cellular service system. The DECT derived protocols lead to a cost effective and efficient implementation. However in order to make the GSM signalling more efficient then in some cases the GSM messages are substituted by short form messages which fit into the time slots of the system in accordance with the present invention. The short form messages do not affect the functionality of the network.

BRIEF DESCRIPTION OF THE DRAWING

The present invention will now be explained and described, by way of example, with reference to the accompanying drawings, wherein FIG. 4 illustrates the GSM arrangement of 8 duplex channels per GSM carrier pair, FIG. 5 illustrates an embodiment of the present invention which is adaptable for use with DECT, FIG. 6 illustrates diagrammatically the structure of a message, FIG. 7 is a diagram illustrating the three layers of protocol used in the system made in accordance with the present invention, FIGS. 9 to 20 are diagrams of a layer 2 message format within the C channel and of a plurality of message types.

DESCRIPTION OF THE PREFERRED EMBODIMENTS

Figure 1:
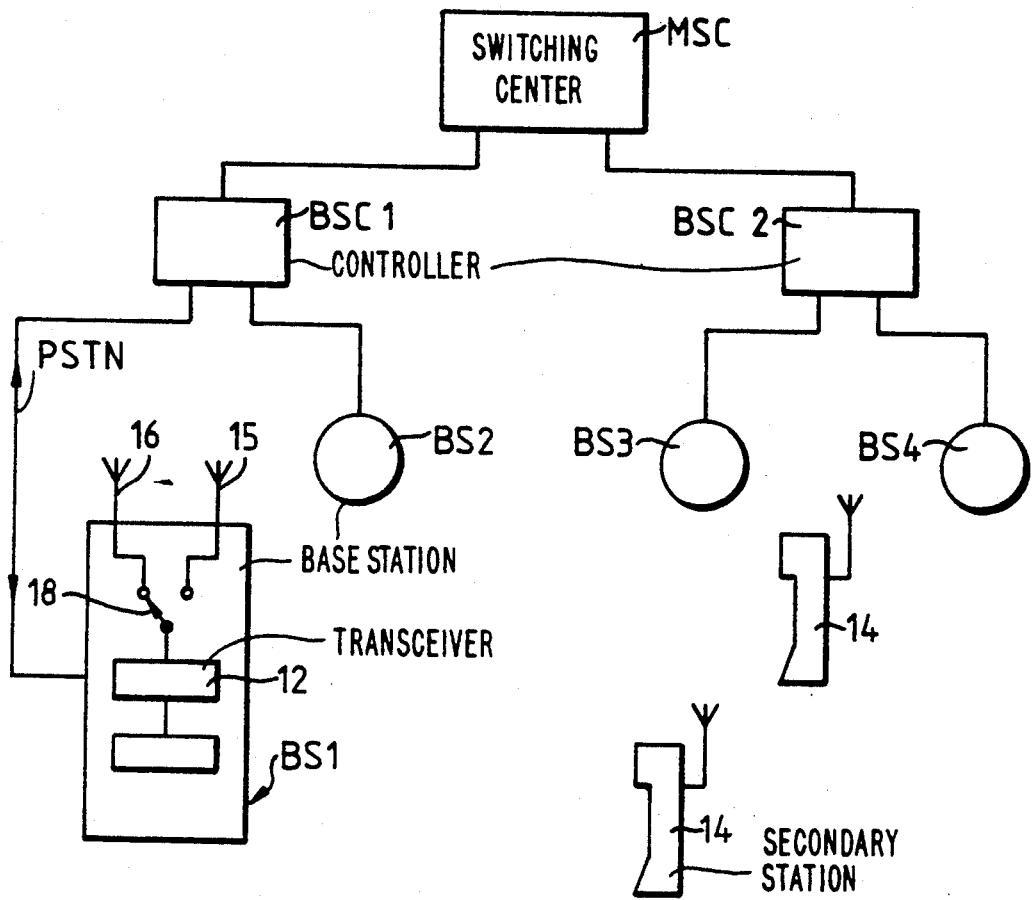
FIG. 1 is a diagram illustrating an embodiment of a communications system made in accordance with the present invention.

Referring to the embodiment shown in FIG. 1, the system comprises a plurality of geographically distributed cells, the boundary of each cell being contiguous with or partially overlapping the boundaries of adjoining cells. The exact shape of each cell is determined by the local topography but typically in a metropolitan environment a cell is between 500 meters and 3 km radius. Each cell contains one or more primary or base stations BS connected to the public switched telephone network, PSTN. The primary stations such as BS1, BS2 or BS3, BS4, which belong to the same cell are connected by landline to a primary station controller BSC1 or BSC2, respectively. The controllers BSC1 or BSC2 are in turn connected by landline to a network mobile switching centre MSC. The primary station BS1, which is shown in greater detail, comprises at least one radio transceiver 12 which is able to communicate on a single frequency TDD channel with a handset or secondary station 14 which is in range. The primary station BS1 is capable of calling a secondary station 14 by transmitting the secondary station's address as part of a paging signal. Conversely each secondary station is capable of making a call and for this purpose it includes a keypad and controller whereby the called number and the calling party's number are transmitted. The latter's number is required for the purposes of billing.

In FIG. 1, the primary station BS1 comprises two antennas 15, 16, either one of which is connectable to the transceiver 12 by an antenna diversity switch 18. By being able to use antenna diversity in the cases of a stationary or slow moving secondary station, the quality of a channel can be improved. Optionally the primary station may have one antenna.

Figure 2:
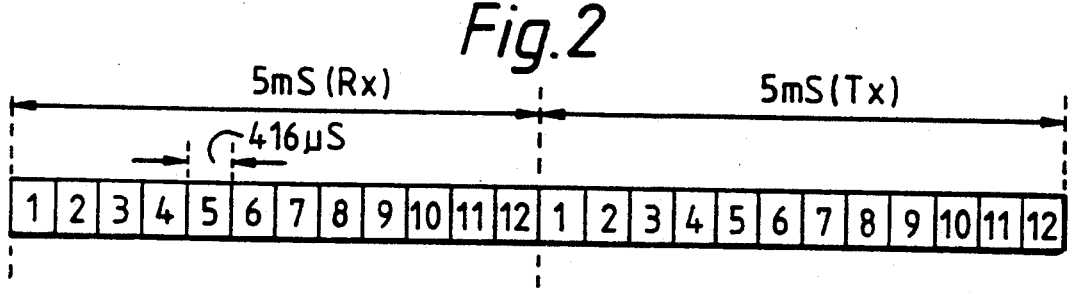
FIG. 2 illustrates the DECT arrangement of 12 TDD channels per single carrier.

FIG. 2 illustrates the single frequency TDD arrangement used in the DECT system. In a frame having a duration of 10 mS there are twelve receive slots and twelve transmit slots each having a duration of 416.67 $\mu$S. This provides 12 duplex DECT channels per DECT carrier. The modulation parameter used is a BT of 0.5. The modulation rate is 1.152 MBits/second and typically the peak effective radiated power is 250 mW. The local oscillator is required to have a moderate stability at frequencies of the order of 1.9 GHz.

Figure 3:
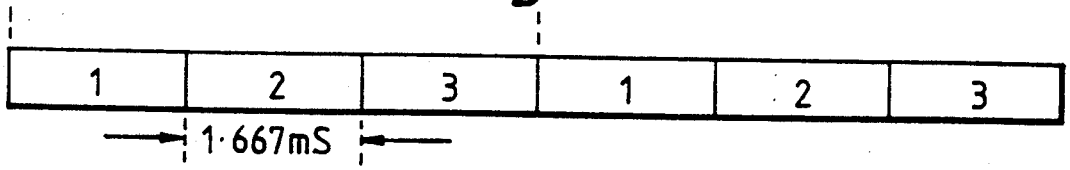
FIG. 3 illustrates the arrangement of 3 TDD channels per single carrier of the system in accordance with the present invention.

FIG. 3 illustrates the single frequency TDD arrangement used in the communications system in accordance with the present invention. A TDD frame having a duration of 10 mS comprises three receive slots and three transmit slots each having a duration of 1.667 mS. This provides 3 full rate duplex channels (or six half rate duplex channels or a combination of full and half rate channels) per carrier. The modulation rate is 270.8333 kbits per second and the modulation parameter BT is 0.3. The spacing between carriers is of the order of 200 kHz. Peak output power is 1 to 2 watts and the stability of the local oscillator is rated as moderate for a frequency in the range 1.5 to 2.3 GHz. The system in accordance with the present invention has by choice some similarity with DECT, notably the frame rate and the speech encoding rate. The slot structure is different in that the preamble and a synchronisation fields of DECT are replaced by a shorter preamble field and an equaliser training sequence and the introduction of tail bits at the end of the burst.

For the purposes of comparison, FIG. 4 illustrates the GSM channel arrangement which comprises 8 duplex GSM channels per GSM carrier pair. Each frame of 8 channels has a duration of 4.615 mS. The modulation rate is 270.8333 kbits/second and the BT is 0.3. The carrier spacing is 200 kHz. The maximum peak effective radiated power is substantially 20 W. The local oscillator is required to have a high stability at frequencies of the order of 900 MHz. The similarities between the system in accordance with the present invention and GSM are in having the same modulation rate, BT and carrier spacing.

These similarities with DECT and GSM can be used to advantage when implementing the system in accordance with the present invention.

FIG. 5 is a block schematic diagram of a single mode primary station 10 and a dual mode secondary station 14.

The primary station 10 comprises a speech or data codec 20 which is coupled on the one hand to the PSTN and on the other hand to, optionally an error coder (not shown), and then to a multiplexer/demultiplexer 22. In the case of speech to be transmitted to the primary station, the multiplexer 22 is controlled to select a predetermined one of the 3 possible transmit slots to pass encoded information to an IF section 24 and then onto an RF section 26 in which the encoded information is frequency up-converted before being passed to a selected one of the antennas 15, 16.

Signals received at the selected one of the antennas 15, 16 are frequency down-converted in the RF section and filtered in the IF section 24. The filtered signal is then applied to an equaliser and coherent demodulator 28 after which it is demultiplexed and then applied to the codec 20 which also comprises error and source decoders.

The primary station will include clocks, a controller and signalling logic which are generally known in the field of digital cellular communications systems and accordingly have not been described or illustrated.

The constructional features enabling the secondary station 14 to function within the system in accordance with the present invention are, with the addition of a keypad 30 and associated control circuitry, essentially the same as those provided in the primary station. In operation speech or data is applied to a codec 32 which on the one hand is connected to an input/output transducer (not shown) and on the other hand is connected to a multiplexer/demultiplexer 34 which is controlled to select the complementary TDD (receive) slot to the (transmit) one selected by the primary station. The packet of digitised speech or data is then relayed through a modulator to an IF section 36 in which it is filtered and from there the speech or data is frequency up-converted in an RF section 38 and passed to an antenna 40. In the case of a received packet of digitised speech or data, after being filtered in the IF section 36 it is applied to an equaliser and coherent demodulator 42 prior to being demultiplexed. The secondary station 14 also includes a clock 44 and signalling logic 46 which comprises means for inserting the secondary station's identity into an outgoing call request.

In order to enable the secondary station 14 to operate in the DECT system then the multiplexer/demultiplexer 34 is operated at a higher rate to provide 12 (as opposed to 3) TDD slots, the IF section 36 comprises another filter suited to filtering a DECT signal, the signalling logic 46 is adapted to work with a different protocol and the RF section is adapted to operate at a different frequency and at a lower output power.

The structure of the messages which may be used in the metropolitan cellular mode is shown in FIG. 6. The structure commences with a preamble 50 which is followed by a training sequence 52 which is used to train the coefficients of the equaliser. The sequence 52 is followed in succession by a signalling field 54, a data field 56 and tail bits 58. The data field 56 could be exchanged for extra guard space. The tail bits are used to allow effective operation of the channel equaliser by adding known bits.

If the channels are in general found to be reciprocal then it may be possible to have an equaliser only in the primary station rather than in both the primary and secondary stations. In the case of only the primary station having an equaliser, the equaliser coefficients are determined using a training sequence in the message from the secondary station. Then an outgoing message from the primary to the secondary station is predistorted in the equaliser so that when received at the secondary station 14 it is substantially undistorted.

The secondary station 14 may be modified further to make it suitable for use with GSM.

When implementing a primary and/or secondary station, many of the components can be the same as or based on those designed for use with DECT and GSM. For example the RF section 38 can be based on the GSM front end and the multiplexer/demultiplexer 34 and codec 32 can be based on the DECT baseband speech processing components.

Optionally provision for call hand-over can be provided in the primary station 10.

Referring to FIG. 7, the signalling protocols at the air interface of the communication network are described as three layers L1, L2, L3. Layer L1 is termed the Physical layer and is concerned with the physical transmission of information. Layer L2 is termed the Link layer and is concerned with conditioning a signal, that is, error checking, channel monitoring and some types of handover. Layer L3 is termed the Network layer which relates to establishing, maintaining and terminating the channel. To provide some compatibility with existing protocols, the system in accordance with the present invention makes use of the GSM network layer protocols which will enable the system to provide facilities such as two-way calling (location registration and wide area paging), authentication, encryption and external handover. DECT type of techniques are used for transmitting the messages which constitute these signalling protocols. Additional facilities can also be provided using DECT signalling and control procedures. In summary the system in accordance with the present invention uses GSM network layer (layer L3) procedures and DECT link and physical layer (layers L2 and L1, respectively) procedures, due allowance being made for the fact that the bit rate and channel bandwidth are lower than in DECT but the same as are used in GSM.

The major principles of the signalling protocols and procedures that will be used in the system made in accordance with the present invention will now be described.

In the interests of compatibility with the GSM and DECT systems, the protocols used will, when expedient, be the same. For example:

GSM Call Control protocols are used for call establishment and termination.

GSM Mobility Management protocols are used for Location Registration, Paging and Authentication.

GSM Radio Resource management protocols are used for "external" handover, that is a handover involving an MSC.

The system in accordance with the present invention uses planned cell layout and planned frequency allocation on each cell. During normal operation the handset or secondary station is responsible for monitoring its serving and neighbouring cells, for reporting these measurements of the primary station BS and for suggesting new frequencies to the BS. Either the secondary station or the network may initiate handover but the primary station has ultimate authority.

In a GSM system the Network layer protocols are multiplexed onto a number of "logical" channels and these logical channels form the interface between the Network layer and lower layers. In a GSM system these messages are then encoded against errors and multiplexed into a number of GSM physical time slots.

In contrast the system in accordance with the present invention maps these "logical" channels via an interworking function, onto the DECT channels and time slots. The GSM Network Layer signalling messages will be mapped onto DECT Link Layer messages and then to DECT physical channels.

The DECT procedures are used for "internal" handover, i.e. handover that does not involve the Mobile Switching Centre MSC.

DECT Link Layer procedures are used for error protection, channel monitoring and reporting measurements of neighbouring cells.

DECT Physical layer structures and techniques are used for: transmission, paging, random access and so forth.

The system in accordance with the present invention uses Functional Channels which are of a type similar to those defined for the DECT system. These are functionally equivalent to the Functional Channels defined for the GSM system. The main differences between the GSM and DECT functional channels are differences in the throughput rate and the fact that the GSM "Dm" channel is further organised into various logical channels.

Figure 8:
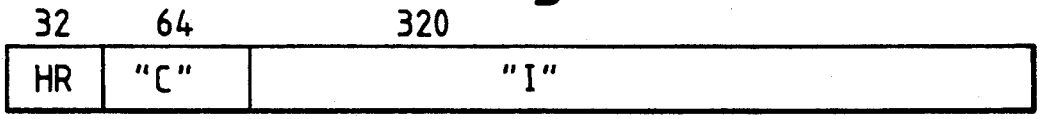
FIG. 8 is a diagram illustrating the typical mapping of functional channels onto a physical channel.

The typical mapping of Functional channels onto physical time slots is shown in FIG. 8 and a Functional channel comprises a header HR, a control or C channel of 64 bits per slot and an information or I channel of 320 bits per slot.

The I channel is used for user data and occasionally for signalling information e.g. at call set up. The I Channel is used for transmitting:
(a) Speech encoded at 32 kb/s (the full rate channel),
(b) Speech encoded at 11.4 kb/s (gross) (the half rate channel),
(c) ISDN bearer B channels.

The C channel is used for sending various types of messages for example Paging messages, Broadcast messages and so forth. More particularly the C channel is used for all signalling functions. Despite the fact that the C channel is physically associated with individual traffic slots the system can use the C channel in either common control or dedicated control modes. When necessary the C channel may use the capacity of the I channel to give a higher throughput/speed. Besides using the C channel for transmitting various types of signalling messages it is also used to broadcast system status messages known as BCCH (Broadcast Common Control Channel). The primary function of the BCCH is the broadcasting of Location Area Identifiers and in some situations broadcasting advice on for example the carriers available on the present cell, the coordinates of BCCH carriers (if any) on neighbouring cells and free channel maps. The BCCH may be physically multiplexed onto either downlink paging/idle slots or onto a reserved carrier used only for signalling. An operator can choose either of these options. It is likely that the former option would be chosen in situations where there were few carriers per primary station and the latter in situations where there were many carriers per primary station.

The system in accordance with the present invention uses the standard GSM layer 3 message format. These messages will be inserted in the appropriate field in the C channel. In order to make the PCN signalling more efficient there are a number of exceptions to this rule, which exceptions include:
(a) broadcasting Local Area Identifiers
(b) reporting measurements of signal strength/quality of adjacent primary stations.

In these cases messages are not padded with extra headers or other information and do not need to be transmitted over several frames but are transmitted in a single DECT layer 2 frame (40 bits). The DECT layer 2 message header will explicitly identify these messages.

For all other signalling procedures the DECT layer L2 message format (or enhanced versions) are used.

Generally the layer L3 messages are inserted into the fields available in the layer L2 C channel. In these cases the header of the layer L2 message will identify the fact that the following field contains a Lap-Dm L3 message.

In order to speed the message transfer there are some exceptions to this rule. In those cases where Lap-Dm messages are rather long (up to 23 octets long). One solution is to send the most common or time critical signalling messages within a single C channel slot. The header on the layer L2 message would identify these types of message.

It is more convenient if a complete short form message can be sent in a single 40 bit field without the need to extend the signalling message over several frames.

The layer L3 messages are embedded into the layer L2 message and some examples of the different types of layer L2 messages will be described.

Figure 9:
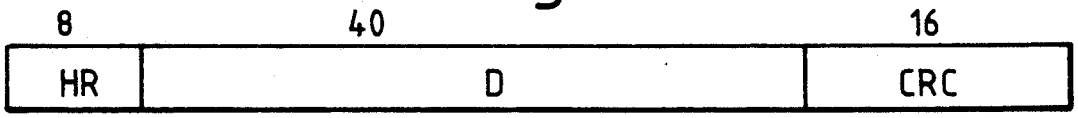

Each burst of transmitted data comprises a 64 bit signalling field plus a data field. The 64 bits in the signalling field form a layer L2 message block whose structure is shown in FIG. 9. The structure comprises three fields, a header HR, data D and CRC. The header HR defines the type of the layer L2 message. One header bit indicates a multiframing which is used for paging. A total of 40 bits is available for the data field. These forty bits are used to transmit the different messages identified in the message type field of the header. The CRC field covers all of the preceding 48 bits i.e. including the header. The types of different messages and the structure of each individual message is shown diagrammatically in FIGS. 10 to 20. These are tabulated below.

Figure 10:
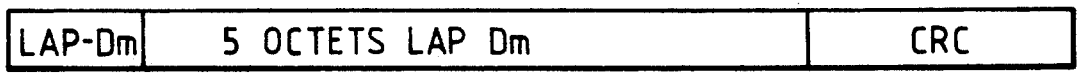
Figure 11:
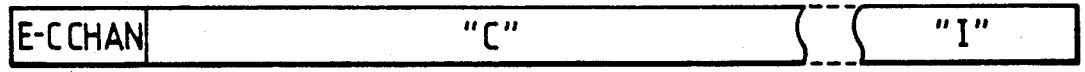

| Figure No. | Message type | Purpose, use and description of the message |
|---|---|---|
| FIG. 10 | Lap-Dm | This type of message will be used to transmit 5 octets of a layer L3 Lap-Dm message. This is how the GSM layer 3 messages will be embedded into the DECT layer 2 message format. |
| FIG. 11 | E-C-chan | This type of message is used to indicate that the entire burst, including the I channel will be used for sending signalling messages. This type of message will typically be used during the call set up phase i.e. while the I channel would otherwise be empty. It might also be used to transmit a handover command |

-continued

Figure 12:
Figure 13:

| Figure No. | Message type | Purpose, use and description of the message |
|---|---|---|
| FIG. 12 | Standard | very quickly. This is the standard message that will be transmitted during the course of a call but where there is no radio link signalling to transmit (i.e. much of the time). The two "Q" bits are used by each end of the link to keep the other end of the link informed of the perceived quality of the serving channel. The "F" bit is used for frequency correction. The "Cell/Call ID" field is used on the downlink to transmit the Cell Identity and on the uplink to transmit the Call Identity. The Lap-Dc field is used to transmit any non-radio link related signalling. |
| FIGS. 13 14 and 15 | Page/E-Page | These messages are used to page a handset. There are two variants of this message: the PAGE message and the Extended PAGE message (E-Page). Every 8th frame the system broadcasts PAGE messages or other system messages in the signalling field of every slot, i.e. the system replaces dedicated signalling channels with a common signalling channel every 8th frame. The shorter PAGE message is the preferred technique and it is used when the Temporary Mobile Station Identity (TMSI) is available. 3 octets will be used for the TMSI field. This is one octet shorter than the maximum allowed by the GSM recommendations. However 3 octets will allow for 16 million unique identities within a single Location Area so it should be more than adequate. Otherwise the full TMSI is broadcast over two frames. The "Free Channel" field (FC) is used to transmit the coordinates of a suggested free channel. The "Colour codes" field (CC) is used to transmit the system colour codes. |
| FIG. 16 | LAI | This type of message is used to transmit the Location Area Identifier (LAI) code. This message is transmitted on:<br>1. "Empty" paging frames. However should it turn out that under some circumstances that there are not enough empty paging frames then the LAI message should be broadcast on:<br>2. Alternate paging frames and/or,<br>3. IDLE channels, or<br>4. On the reserved BCCH carrier, if such a carrier is provided. |
| FIG. 17 | MEAS-RPT | This is an abbreviated form of the GSM Measurement report (MR) message. The handset can send reports (MR1 and MR2) of up to two adjacent primary stations in a single signalling unit. The secondary station begins to send these messages when it may need to perform an external handover. The secondary station does not need to send these messages if it needs to perform an internal handover. |
| FIG. 18 | H/O-Sgst | This is a Handover Suggestion message. The secondary station sends this message to the primary station controller BSC when it realises it may soon want to perform an external handover. This message is purely advisory and the BSC can completely ignore this message if it chooses. The BSC decides when and if the Mobile Switching Centre MSC should be recommended to perform an external handover. However the use of this message will mean freedom in the implementation of the BSC. The BSC can either monitor all stations continuously and decide if an external handover is necessary or it can wait for the primary stations to suggest that a handover is necessary before it does anything. The "Cell" and "Channel Description" fields contain the coordinates of the suggested channel. |
| FIG. 19 | IDLE | This message is used to designate an idle channel. It contains the "Cell ID" code and some "System Information", further System Information is also given in the I channel. |
| FIG. 20 | BCCH | This message is used to designate a carrier that is reserved exclusively for signalling. It is not mandatory to reserve a carrier for signalling but it would be convenient to do so if there are a lot of carriers on each BS. |

During the course of a call the secondary station must monitor its serving channel, other channels on its serving primary station and its neighbouring primary stations. The secondary stations monitors the channels in accordance with the following strategy. If the received signal level is high but the signal quality is low (case 1 situation) then the channel is probably being corrupted by interference and the secondary station should look for another channel on the same primary station. Alternatively if the received signal level is low and the signal quality is low (case 2 situation) then the secondary station should scan neighbouring primary stations for a free channel. In either case handover may be necessary.

There are two distinct types of handover, namely external handover which involves switching by the MSC and BSC and internal handover which involves the BSC but not the MSC. The difference is that in the former case network signalling is needed whereas in the latter case it is not. These two types of handover are provided for in the GSM system. However the GSM system uses different fixed network procedures but the same radio path procedures as are used by the system in accordance with the present invention. The internal handover is handled autonomously by the BSC and the MSC is informed when the procedure is complete. The MSC on the other hand decides when and if an external handover should occur.

In the case 1 situation mentioned above the secondary station may go on to execute an internal handover as per the DECT procedures. This means that the BSC can in practice be built from a DECT Radio Link Exchange (RLE) equipment. Also to avoid having to modify the DECT RLE to monitor all calls to decide if an external handover should be performed soon, the secondary station will inform the BSC when it decides that an external handover is needed and the BSC can check this and then inform the MSC.

If an internal handover is needed then the secondary station continues transmitting on the old channel whilst requesting a new channel using an appropriate burst. The handset may also send traffic data along with the channel request on the new channel. Upon receipt of this burst the primary station acknowledges the channel at which point the secondary station releases the old one. The BSC network may override the new channel suggested by the secondary station by acknowledging the handover request with the coordinates of a new channel. This maintains the necessary high speed handover but allows the network operator the opportunity to load balance if it is considered desirable. If the secondary station does not receive acknowledgement on the new channel, it may try other channels. If the secondary station is unsuccessful in finding a new channel in a suitable time, it will stop transmitting and the old primary stations will initiate a call release. Upon successful establishment of the new channel, the BSC will tell the old primary station to stop transmissions. In the case 2 situation where an inter cell or external handover is necessary the secondary station must determine if the neighbouring primary station belongs to its present BS or to another BS. The secondary station can deduce this by reading the Cell Identifier field of the neighbouring Base Station. If the target neighbouring primary station belongs to the same BSC then it may go on to execute an internal handover. Otherwise if the target primary station belongs to another BSC then the secondary station must follow the procedure for external handover.

For external handover the handset follows a procedure in which the secondary station monitors the signal level and quality of the serving channel, and that of neighbouring cells. The signal level/quality is averaged over a period and afterwards this measurement is reported to the primary station. The secondary station may suggest to the network that an external handover is needed by sending a "Handover Suggestion" message. This would relieve the BSC of monitoring every call continuously. The handover decision is taken by the network. The first stage in the decision is where the BSC decides whether or not to refer this handover to the MSC for further processing. The second stage is where the MSC decides when and if an external handover should be performed, and, if so, executes the external handover.

From reading the present disclosure, other modifications will be apparent to persons skilled in the art. Such modifications may involve other features which are already known in the design, manufacture and use of communication systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. A communications system comprising a dual mode hand portable transceiver for metropolitan cellular and cordless telecommunications use, forming a secondary station, and a primary station, the primary and secondary stations each comprising respective radio transceiving means for duplex radio communication between the stations, said primary and secondary stations each further comprising:

a single encoding means for digitizing speech to form transmitter digitized speech signals, and a single decoding means for recovering speech from received digitized speech signals, and means for formatting said digitized speech signals to produce a modulation signal according to a selected one of first and second protocols, selection of the protocol being responsive to control by a user of the transceiver, said first protocol using 3 full rate channels per carrier, with each channel carrying signals at substantially 32 kbits per second; and said second protocol using 2 half rate duplex channels carrying signals at substantially 11.4 kbits per second, and each respective transceiver comprising a single transmitter means for modulating a carrier with said modulation signal at a carrier bit rate of substantially 270.8333 kbits per second, and transmitting the resultant formatted transmitter digitized speech signals over a duplex channel system.

2. A system as claimed in claim 1, characterised in that the frame length is substantially 10 milliseconds.

3. A system as claimed in claim 1 characterised in that communication between the primary and secondary stations is by single frequency time division duplex.

4. A system as claimed in claim 3, characterised in that each channel comprises two slots and the message structure for each slot comprises successively a preamble, a training sequence, a signalling field, a data field and tail bits.

5. A system as claimed in claim 3 characterised in that broadcast, common and dedicated control channels are provided on the same radio carrier.

6. A system as claimed in claim 3 characterised in that broadcast and common control are provided on a reserved radio carrier.

7. A system as claimed in claim 1 characterised in that the modulation parameter (bandwidth x time) BT is 0.3.

8. A system as claimed in claim 7, having at least two carriers and characterised in that adjacent carriers are spaced apart by substantially 200 KHz.

9. A system as claimed in claim 1, characterised in that the primary station is connected to a public switched telephone network (PSTN).

10. A system as claimed in claim 1, characterised in that the primary and secondary stations each operate in accordance with a protocol which permits either station to initiate a call to the other station.

11. A system as claimed in claim 10, characterised in that each secondary station includes a channel equaliser.

12. A system as claimed in claim 1, characterised in that each primary station includes a channel equaliser for equalising a digital signal from the secondary station.

13. A system as claimed in claim 12, characterised in that each channel comprises two slots and the message structure for each slot comprises successively a preamble, a training sequence, a signalling field, a data field and tail bits; and the channel equaliser pre-distorts a digital signal to be transmitted to a secondary station, the degree of pre-distortion being determined on the basis that the channel is a reciprocal channel and that the adjustment of the equaliser coefficients using the training sequence is such that the signal received at the secondary station is substantially undistorted.

14. A system as claimed in claim 1 characterised in that the primary station has means to practise antenna diversity.

15. A system as claimed in claim 1 further comprising means for permitting internal and external handover.

16. A system as claimed in claim 1 characterised in that GSM signalling protocols are adapted to work on DECT channels.

17. A system as claimed in claim 1 having a signalling protocol comprising a physical layer, a link layer and network layer protocols, characterised in that at least some of the signalling messages for the link layer comprise short form messages which are contained in a single message frame.

18. A dual mode hand portable transceiver for metropolitan cellular and cordless telecommunications use, comprising:
  a single encoding means for digitizing speech to form transmitter digitized speech signals, and decoding means for recovering speech from received digitized speech signals,
  a single means for formatting said digitized speech signals to produce a modulation signal according to a selected one of first and second protocols, selection of the protocol being responsive to control by a user of the transceiver, said first protocol using 3 full rate channels per carrier, with each channel carrying signals at substantially 32 kbits per second; and said second protocol using 2 half rate duplex channels carrying signals at substantially 11.4 kbits per second, and
  a single means for modulating a carrier with said modulation signal at a carrier bit rate of substantially 270.8333 kbits per second, and transmitting the resultant formatted transmitter digitized speech signals over a duplex channel system.

19. A transceiver as claimed in claim 18, characterized in that said transceiver is arranged to communicate with a primary station by single frequency time division duplex.

20. A transceiver as claimed in claim 19, characterised in that each channel comprises two slots and the message structure for each slot comprises successively a preamble, a training sequence, a signalling field, a data field and tail bits.

21. A transceiver as claimed in claim 19, characterised in that the primary and secondary stations each operate in accordance with a protocol which permits either station to initiate a call to the other station.

22. A transceiver as claimed in claim 18 characterised in that the modulation parameter (bandwidth × time) BT is 0.3.

23. A transceiver as claimed in claim 18, for responding to a signalling protocol comprising a physical layer, a link layer and network layer protocols, characterised in that at least some of the signalling messages for the link layer comprise short form messages which are contained in a single message frame.

24. A transceiver as claimed in claim 18, characterized in that said transceiver comprises means for operating in a DECT system mode, said single means for modulating comprising means for setting the modulation rate to 1.152 Mbits/S, and said single means for formatting comprising means for setting the multiplexing rate to 12 duplex channels in a 10 mS frame, and for selecting the appropriate protocol.

* * * * *